UNITED STATES PATENT OFFICE.

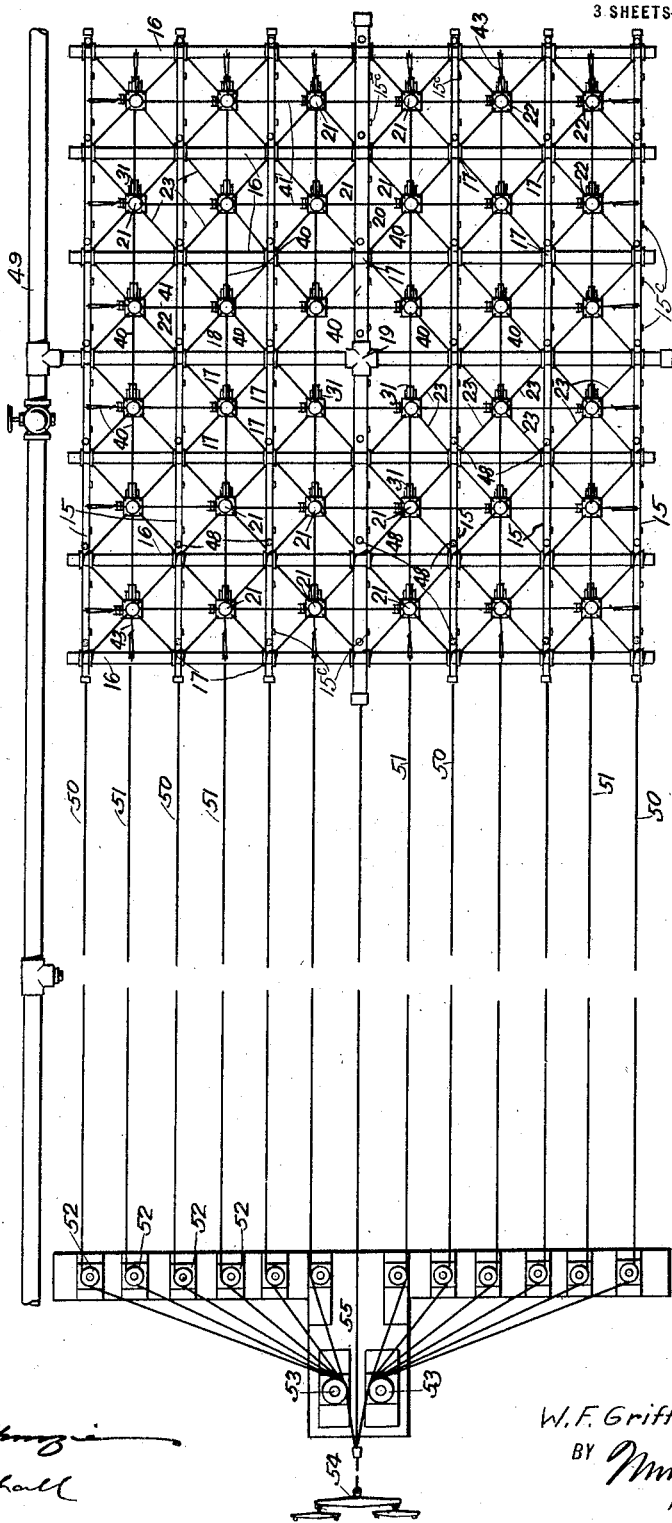

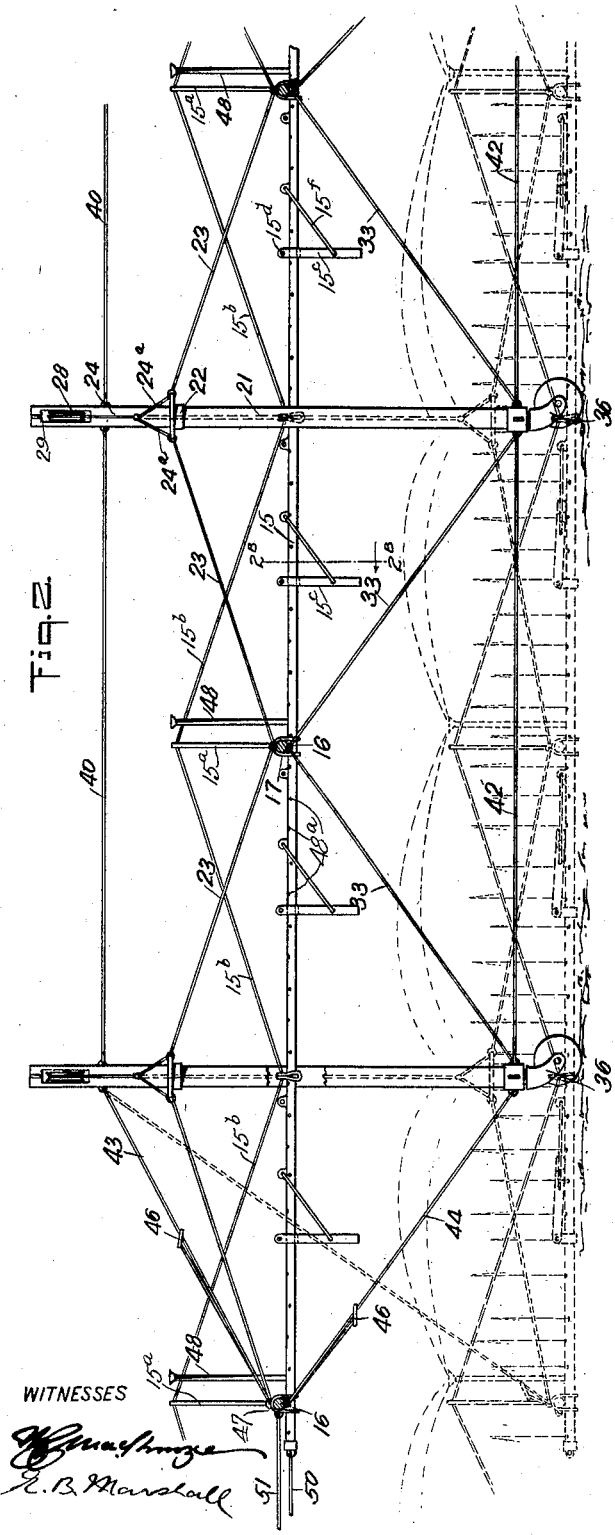
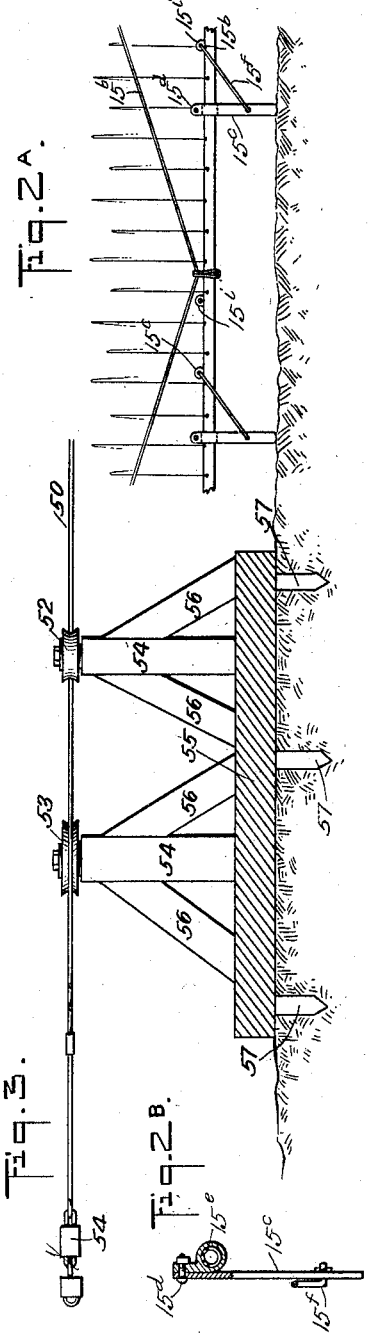

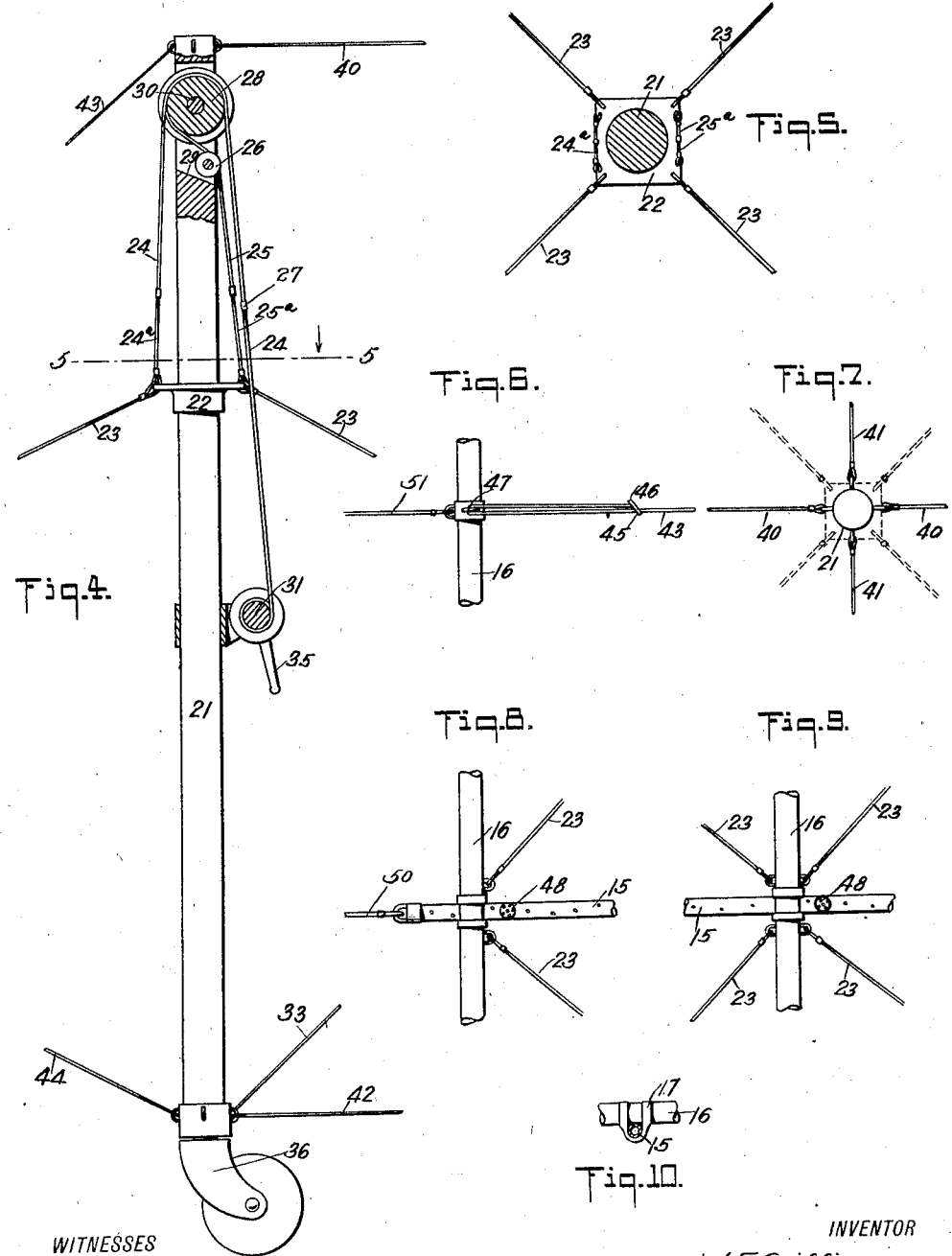

WILLIAM FLOURNOY GRIFFIN, OF GREENFIELD, OKLAHOMA.

PORTABLE IRRIGATION APPARATUS.

1,387,256.     Specification of Letters Patent.     Patented Aug. 9, 1921.

Application filed June 26, 1918. Serial No. 241,973.

*To all whom it may concern:*

Be it known that I, WILLIAM FLOURNOY GRIFFIN, a citizen of the United States, and a resident of Greenfield, in the county of Blaine and State of Oklahoma, have invented a new and Improved Portable Irrigation Apparatus, of which the following is a full, clear, and exact description.

My invention has for its object to provide a cheap, portable irrigation apparatus which is light in weight and which may be used economically on an extensive scale for irrigating field crops.

Another object of the invention is to provide the irrigation apparatus with a system of pipes, bound firmly together, which is mounted on standards provided with casters, it being possible to raise the pipes when they are to be moved to a new position, so that they will not interfere with the growing plants. When the pipes reach the desired position, they may be lowered to the ground so that the standards will not be required to support the water which will flow through the pipes. This permits of a very light construction.

Because of the face that the standards are never required to support the pipes filled with water the construction is exceedingly light. The whole construction with the pipes filled with water weighs about twenty times as much as when empty.

Additional objects of the invention will appear in the following specification in which the preferred form of my invention is described.

In the drawings similar reference characters refer to similar parts in all the views, in which—

Figure 1 is a plan view illustrating the invention;

Fig. 2 is a sectional fragmentary elevation showing how the pipes are supported on the standards;

Fig. 2ª is a fragmentary view showing the apparatus supported by the legs;

Fig. 2ᵇ is an enlarged sectional view on the line 2ᵇ—2ᵇ in Fig. 2;

Fig. 3 is an enlarged sectional elevation showing the means provided for moving the apparatus from place to place;

Fig. 4 is an enlarged sectional view illustrating the construction of one of the standards;

Fig. 5 is a sectional plan view illustrating how the sleeves are mounted on the standards;

Fig. 6 is a fragmentary view illustrating the means provided for connecting the standards with the end rods to which the pipes are secured;

Fig. 7 is a sectional view illustrating the ropes which are used to connect the standards;

Fig. 8 is a fragmentary view illustrating the connection of one of the pipes with one of the end rods;

Fig. 9 is a fragmentary view illustrating the connection of one of the other rods with the pipe; and Fig. 10 is a fragmentary view showing how the pipes are secured to the rods.

By referring to the drawings, it will be seen that a plurality of pipes 15 are provided, these pipes being disposed parallelly to each other and being spaced apart as best illustrated in Fig. 1 of the drawings. The pipes 15 are secured to transverse rods 16 by couplings 17, best illustrated in Fig. 10 of the drawings. Each of these couplings is disposed under one of the pipes 15 at one side of a rod 16, both ends of the coupling being disposed over the rod 16 and down and under the pipe 15 at the other side of the said rod 16. There are also secured to the pipes 15 a main pipe 18 which is connected near the center of the apparatus at 19 with another main pipe 20 which is secured to the rod 16 by means of couplings 17. Struts 15ª are mounted on the couplings 17 and cables 15ᵇ extend from the top of the said struts to the pipes 15 intermediate of the struts to support the pipes at points disposed between the couplings 17 as well as at the couplings.

It will be seen that with this arrangement a rectangular unit is provided, the pipes and rods of which are disposed substantially in a horizontal plane. This unit is supported on standards 21 which are spaced apart as best illustrated in Fig. 1 of the drawings, one of the standards 21 being preferably disposed within each rectangle formed by neighboring pipes 15 and rods 16.

Slidably mounted on the standards 21, there are sleeves 22 from the corners of which supporting lines 23 extend, these supporting lines 23 being secured at the couplings 17 for supporting the pipes 15 and the rods 16. To the sleeves 22 there are secured ropes 24 and 25, the ropes 25 passing over an idler 26 and being secured to the rope 24 at 27. The two ropes then pass over a sheave 28 which is disposed in an opening 29 in the standard 21 and which rotates on the pintle 30. The rope 24 after passing over the sheave 28 extends down to the drum 31. Ropes 33 are secured to the pipes 15 at the couplings 17, the other ends of the said ropes being secured to the bottom of the standards 21. When the pipes 15 are raised by the ropes 23, the ropes 33 become taut and the pipes are held securely in position so that they may be moved about. The drums 31 are rotatably mounted on brackets 31ª extending from collar 31ᵇ secured to the standards 21.

It will, therefore, be seen that when the drum 31 is rotated in one direction by the crank 35, it will serve to draw down the rope 24, and that when the drum is rotated in the opposite direction, it will release the rope 24. By this means the sleeves 22 may be moved upwardly or downwardly on the standard 21. It is possible in this way to raise or lower the unit consisting of the pipes 15 and the rods 16.

Each of the standards is constructed in the manner set forth, which is best illustrated in Fig. 4, and on each standard there is mounted a sleeve 22 in the manner which has been described. It is also understood that each of the standards 21 is mounted on a caster 36. If desired, the ropes 24, 25 may have loops 24ª, 25ª which are secured to the sleeves 22 at points spaced apart, this being illustrated in Fig. 5 of the drawings.

The tops of the standards are connected together by ropes 40 which extend parallelly with the pipes 15 and by transverse ropes 41. In a similar way the bottoms of the standards are connected by ropes 42 which extend parallelly with the ropes 40 and by additional ropes which connect the bottoms of the standards 21 and which are disposed parallelly with the rods 16. At the standards which are adjacent the end rods 16 and the end pipes 15, ropes 43 extend downwardly from the top of the standards and ropes 44 extend upwardly from the end of the standards, these ropes being secured to the end pipes 15 and the end rods 16, as best shown in Fig. 6, the rope passing through an eye 45 in a tie member 46, then through an eye 47 on the end rod 16 or end pipe 15 and back to the tie member 46 to which it is secured. It will be understood that with this construction, it is possible to tighten the ropes 43 and 44 when desired.

It will be understood that when the pipes are to be lowered to the ground, the ropes 42 and the transverse ropes at the bottom of the standards are disconnected from the standards, so that they will not interfere with the pipes.

Fig. 8 shows how one of the pipes 15 is secured to an end rod 16, one of the nozzles on the pipe 15 being illustrated at 48. It is understood that there are a plurality of these nozzles 48 on each of the pipes 15 and that the nozzles 48 may be of any desired construction.

It is also understood that the pipes are provided with perforations 48ª through which the fluid is sprayed.

Fig. 9 illustrates the connection of one of the pipes 15 with one of the inner rods 16.

From the above it will be seen that the apparatus may be moved to any desired place in the field, when either the main 18 or the main 20 may be coupled with a stationary main 49. When it is desired to move the apparatus to another place on the field, this may be done after the unit consisting of the pipes 15 and the rods 16 is raised by means of the cranks which have been described.

To an end rod 16 there are secured a plurality of cables 50 and 51, the cables 50 being secured to the end rods 16 at the pipes 15 and the cables 51 being secured to the end rods 16 at the points adjacent the eyes 47 illustrated in Fig. 6 of the drawings. These cables 50 and 51 pass each around a sheave 52, the sheave 52 being secured to the ground in any desired manner. The cables 50 and 51 then preferably pass around sheaves 53 to any convenient means to pull the cables 50 and 51 simultaneously to move the apparatus from one part of the field to another. In Fig. 1 of the drawings I show a whiffletree 54 to which the cables 50 and 51 lead, hence it is possible to hitch draft animals to this whiffletree and by this means move the apparatus from one part of a field to another.

It will be understood that if desired the cables 50 and 51 may be secured to a side of the unit instead of to an end.

In Fig. 3 of the drawings I show one means which may be employed to secure the sheaves 52 and 53 in place. It will be seen that they are mounted on standards 54, the standards being secured to a base 55 and being held in position by braces 56. The base 55 has teeth 57 by which it may be conveniently held in place on the ground. The pipes are lowered progressively from one side to the other from the position shown by the full lines in Fig. 2 of the drawings to the position shown by the dotted lines in that figure, and, when this is done, one side of the apparatus will rest on the ground while the remainder of the apparatus is being lowered. As one side rests on the ground, the swinging of the appartus is prevented. The apparatus is raised commencing at one side and working to its other side. When the apparatus rests on the ground, the wheels of the casters 36 may be locked so that they cannot roll; the ropes 23 are kept sufficiently taut to prevent any swaying of the upper ends of the standards.

The apparatus may be used not only for watering plants in the field but also to spray the plants with an insecticide or germacide.

When it is desired to support the pipes 15 above the ground when the apparatus is in use, the legs 15°, which are pivoted at 15ᵈ to collars 15ᵉ mounted on the pipes 15, are lowered as shown in Fig. 2ᵃ are serve to support the pipes. These legs 15ᶜ may be used in this way to advantage when the crops have grown to a considerable distance above the ground and materially limits the spread of the water from the nozzle. The legs 15ᶜ are held in position by braces 15ᶠ which are pivoted to the legs 15ᶜ and which have hooks 15ʰ for engaging either the eyes 15ⁱ or the eyes 15ʲ. When the hooks 15ʰ engage the eyes 15ⁱ, they are held in operative position and when they engage the eyes 15ʲ they are held in inoperative position.

Having thus described my invention, I claim as new and desire to secure by Letters Patent:

1. In a portable irrigating apparatus, a plurality of pipes having spraying outlets, spaced apart horizontally over a predetermined area, transverse horizontal means for holding the pipes in position relatively to each other, a plurality of standards disposed between the pipes, means for holding the standards in position relatively to each other, and means supported by the standards for raising the pipes and the transverse horizontal means.

2. In a portable irrigation apparatus, a plurality of standards spaced apart, a plurality of sleeves, one slidably mounted on each standard, a plurality of pipes having spraying outlets, supporting means extending from the sleeves to the pipes, and means to raise the sleeves.

3. In a portable irrigation apparatus, a plurality of standards spaced apart, a plurality of sleeves, one slidably mounted on each standard, a plurality of pipes having spraying outlets, supporting means radiating from the sleeves and secured to the pipes, and sheaves on the standards over which the supporting means are disposed.

4. In a portable irrigation apparatus, a plurality of standards spaced apart, a plurality of pipes having spraying outlets, means rediating from the standards for raising the pipes relatively thereto, ropes connecting the pipes with the bottom of the standards, and means connecting the standards.

5. In a portable irrigation apparatus, a plurality of pipes secured together and provided with spraying outlets, means for holding the pipes in position relatively to each other, a plurality of standards spaced apart between the pipes and the said means, supports radiating from the standards and secured to the pipes, and means for moving the standards and pipes from place to place.

6. In a portable irrigation apparatus, a set of pipes having spraying outlets and spaced apart, means to supply the pipes with a fluid, spacing means for holding the pipes in normal position relatively to each other, a plurality of standards spaced apart between the pipes, and means radiating from the standards for raising the pipes relatively thereto.

7. In a portable irrigation apparatus, a set of pipes having spraying outlets and spaced apart, means to supply the pipes with a fluid, spacing means for holding the pipes in normal position relatively to each other, a plurality of standards spaced apart between the pipes, a plurality of supporting means operable relatively to each other which radiate from the standards and are secured to the pipes, casters on the standards, and means for moving the standards and pipes from place to place.

8. In a portable irrigation apparatus, a set of pipes having spraying outlets and spaced apart, means to supply the pipes with a fluid, spacing means for holding the pipes in normal position relatively to each other, a plurality of standards spaced apart between the pipes, a plurality of means radiating from the standards and operable relatively to each other, the last mentioned means being secured to the pipes for raising the latter, and means for holding the standards in normal position relatively to each other.

9. In a portable irrigation apparatus, a set of pipes having spraying outlets and spaced apart, means to supply the pipes with a fluid, spacing means for holding the pipes in normal position relatively to each other, a plurality of standards spaced apart between the pipes, means radiating from the standards for raising the pipes relatively thereto, and means for holding the standards in normal position relatively to each other.

10. In a portable irrigation apparatus, a set of horizontally parallel pipes having spraying outlets and spaced apart, means to supply the pipes with a fluid, transverse rods to which the pipes are secured, standards spaced apart between the pipes, casters on the standards, means radiating from the standards and secured to the pipes for raising the latter, means connecting the standards together and with the end pipes, and rods for holding the standards spaced apart.

11. In a portable irrigation apparatus, a set of horizontally parallel pipes having spraying outlets and spaced apart, means to supply the pipes with a fluid, transverse rods to which the pipes are secured, standards spaced apart between the pipes, casters on the standards, means for raising the pipes relatively to the standards, means connecting the standards together and with the end pipes, and rods for holding the standards spaced apart.

12. In a portable irrigation apparatus, a set of horizontally parallel pipes having spraying outlets and spaced apart, means to supply the pipes with a fluid, transverse rods to which the pipes are secured, standards spaced apart between the pipes, casters on the standards, means radiating from the standards and secured to the pipes for raising the latter, means connecting the standards together and with the end pipes, rods for holding the standards spaced apart, sheaves spaced from each other and from the rods and pipes, ropes secured to an end transverse rod at points spaced apart and disposed one around each sheave, and means to draw on the ropes simultaneously.

13. In a portable irrigation apparatus, a pipe having spraying outlets, a plurality of standards, means for holding the standards in position relatively to each other, lines secured to the pipes, means for supporting the lines on the standards, struts mounted on the pipes at the points where the lines are secured thereto, and cables secured to the top of the struts and to the pipes intermediate of the struts.

14. In a portable irrigation apparatus, a pipe having spraying outlets, a plurality of standards, means for holding the standards in position relatively to each other, means by which the pipes may be supported on the standards, legs pivoted to the pipes, and means for holding the legs in position relatively to the pipes.

15. In a portable irrigation apparatus, an open frame including a plurality of pipes having spraying outlets, a plurality of standards spaced apart in the open frame, casters on the standards, means for holding the standards in position relatively to each other, and a plurality of means on the standards above the open frame by which the open frame may be raised and may be supported.

16. In a portable irrigation apparatus, an open frame including a plurality of pipes having spraying outlets, a plurality of standards spaced apart in the open frame, casters on the standards, flexible means connecting the standards for holding them in position relatively to each other, and a plurality of means on the standards above the open frame by which the open frame may be raised and may be supported.

17. In a portable irrigation apparatus, an open frame including a plurality of pipes having spraying outlets, a plurality of standards spaced apart in the open frame, unicycle supports for the standards, means for holding the standards in position relatively to each other, and a plurality of means on the standards above the open frame by which the open frame may be raised and may be supported.

WILLIAM FLOURNOY GRIFFIN.